(12) United States Patent
Greene et al.

(10) Patent No.: US 6,836,700 B2
(45) Date of Patent: Dec. 28, 2004

(54) SYSTEM AND METHOD GENERATING A TRAJECTORY FOR AN END EFFECTOR

(75) Inventors: Charles A. Greene, Elyria, OH (US); Larry S. Phillips, Brookpark, OH (US)

(73) Assignee: Advanced Robotic Technologies, Inc., Cleveland, OH (US)

( * ) Notice: Subject to any disclaimer, the term of this patent is extended or adjusted under 35 U.S.C. 154(b) by 116 days.

(21) Appl. No.: 10/224,906

(22) Filed: Aug. 21, 2002

(65) Prior Publication Data

US 2004/0019407 A1 Jan. 29, 2004

Related U.S. Application Data

(60) Provisional application No. 60/399,232, filed on Jul. 29, 2002, and provisional application No. 60/400,115, filed on Aug. 1, 2002.

(51) Int. Cl.[7] .............................................. G06F 19/00
(52) U.S. Cl. .................... 700/245; 700/187; 700/250; 118/681; 118/316; 118/687; 239/227; 239/243; 901/7; 901/43; 901/47
(58) Field of Search ................................ 700/245, 187, 700/250; 118/681, 316, 687, 695, 712, 323, 324, 313, 314; 239/227, 243; 901/43, 47, 7; 427/8, 421, 424; 701/300; 37/414

(56) References Cited

U.S. PATENT DOCUMENTS

| | | | |
|---|---|---|---|
| 5,429,682 A | * 7/1995 | Harlow et al. | 118/681 |
| 5,477,459 A | * 12/1995 | Clegg et al. | 701/300 |
| 5,645,884 A | 7/1997 | Harlow, Jr. et al. | |
| 5,957,263 A | 9/1999 | Espenschied | |
| 6,108,949 A | * 8/2000 | Singh et al. | 37/414 |
| 6,278,906 B1 | * 8/2001 | Piepmeier et al. | 700/250 |
| 6,356,806 B1 | * 3/2002 | Grob et al. | 700/245 |

* cited by examiner

*Primary Examiner*—Thomas G. Black
*Assistant Examiner*—McDieunel Marc
(74) *Attorney, Agent, or Firm*—Renner, Otto, Boisselle & Sklar, LLP

(57) ABSTRACT

A method, program embodied on a computer readable medium, and various systems are provided for generating a process trajectory. A normalized image of an object is displayed on a display device of a computer system, the object including a surface that is to be processed using an end effector. A number of predefined trajectories are stored in a memory of the computer system, each of the predefined trajectories defining a motion of the end effector to process a surface of one of a number of spatial definitions. A trajectory generation system is implemented to generate the process trajectory for the end effector to process the surface of the object by associating at least one of the predefined trajectories with the normalized image.

62 Claims, 8 Drawing Sheets

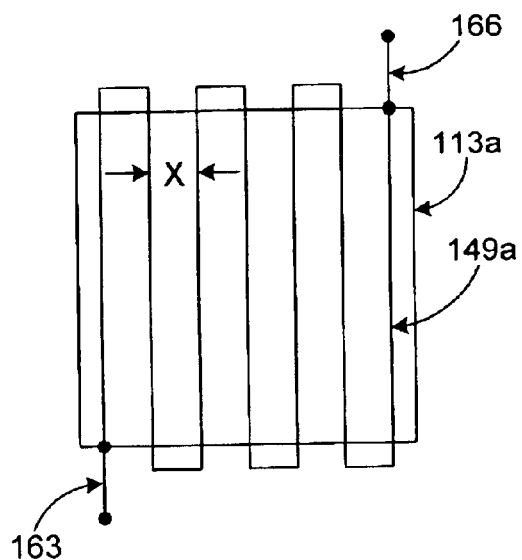
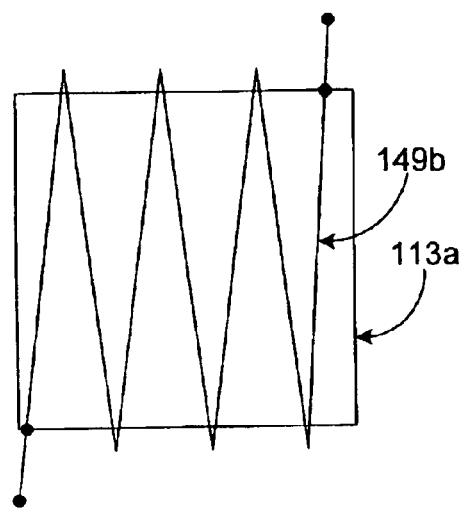
FIG. 2A  FIG. 2B
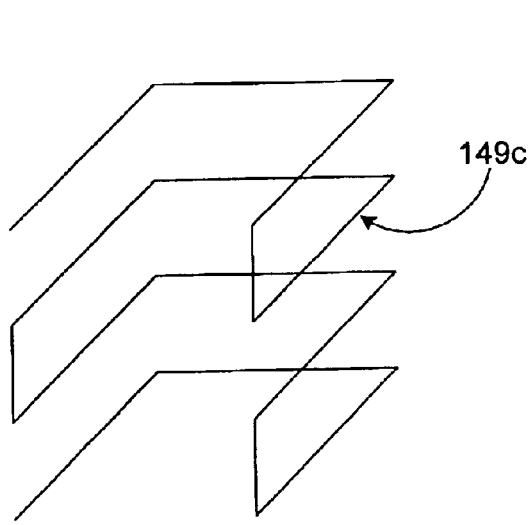
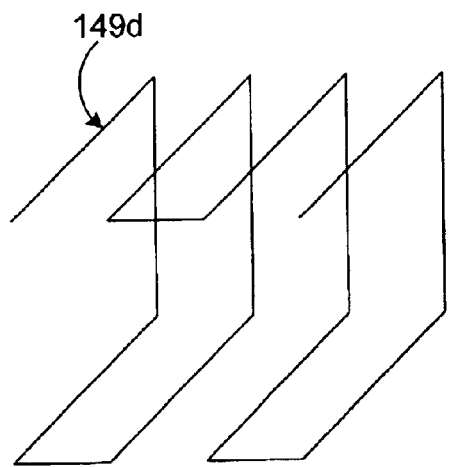
FIG. 3A  FIG. 3B

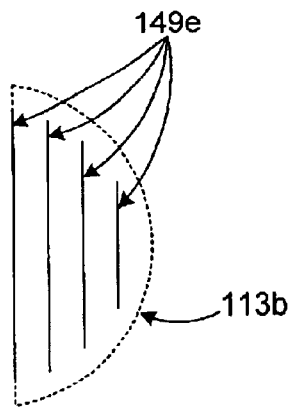 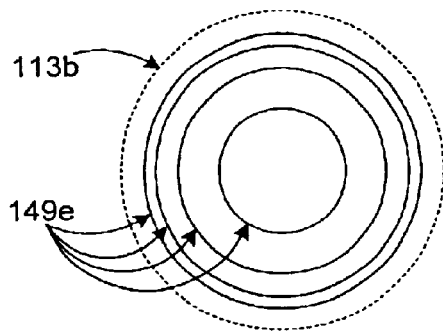
FIG. 4A  FIG. 4B
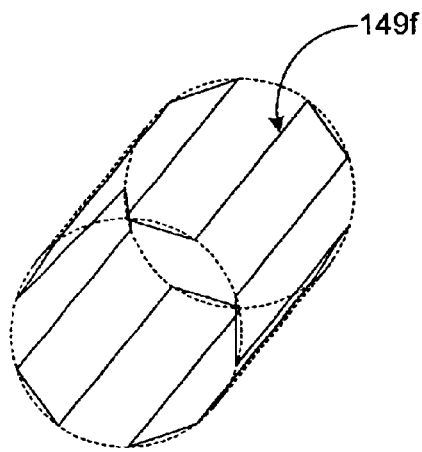 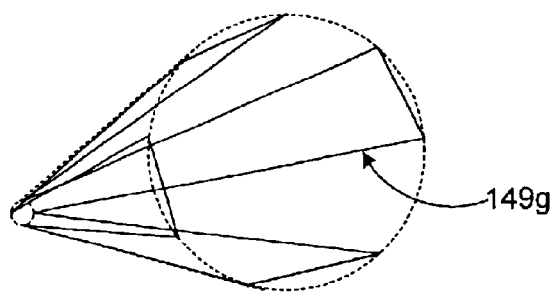
FIG. 5  FIG. 6
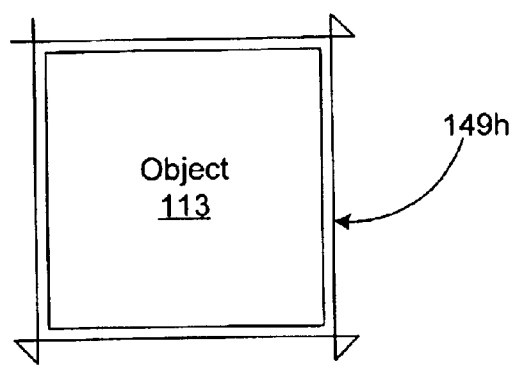
FIG. 7

SYSTEM AND METHOD GENERATING A TRAJECTORY FOR AN END EFFECTOR

CROSS REFERENCE TO RELATED APPLICATIONS

This patent application claims priority to both U.S. Provisional Patent Application entitled "Coating Machine and Method and Associated Software" filed on Jul. 29, 2002 and assigned Ser. No. 60/399,232 and U.S. Provisional Patent Application entitled "System and Method Generating a Trajectory for an End Effector" filed on Aug. 1, 2002 and assigned Ser. No. 60/400,115, both of which are incorporated herein by reference.

FIELD OF THE INVENTION

The present invention relates to the field of robotics. More particularly, the invention relates to a method and associated software for generating robot motion coordinates for a coating machine.

BACKGROUND

Reference is made to U.S. Pat. Nos. 5,645,884 and 5,957,263, the entire disclosures of which hereby are incorporated by reference.

A machine has been used in the past to program robotic machines (referred to as robots below) to effect various functions. Initially, the setup of these functions can be a tedious process, as the robot must be programmed for each motion. An exemplary method of programming a robot is to manually operate the robot through the required motions while storing information representing those motions in memory.

A motion is defined by selecting a start location and an end location and typically, this process is accomplished using a teach pendant. In general, a teach pendent is a hand held control station which includes several control functions for each axis of motion, such as jog forward, jog reverse and teach. Using the teach pendant, the robot is positioned in space at the desired start location via the jog forward and jog reverse functions. Once in the desired location, the teach button is pressed to instruct the robot to retain the present location in memory. The robot is then jogged to the second location in space and the teach button is pressed, storing the second location into memory.

If the move is a simple straight line, then the process is complete. In most coating applications, however, this is not the case. Typically, the object has various curves, corners, crevices, humps, etc. that require precise positioning of the robot in order to achieve a quality coating. Thus, depending on the specific contour of the object, the process of teaching the robot each start and end location can be very tedious and time consuming.

In addition to being a tedious process, another disadvantage to such programming is that in order to confirm that the robot motions are proper for a given task, it is necessary that the robot be operated to carry out the given task. Thus, for example, if the robot is used in a coating process, e.g., painting, electro-static coating, or some other process, the actual coating line must be operated at normal speed and process parameters to be sure that the motions carried out manually are producing a proper coating on, say, a given part. Exemplary parts might be the inside of an oven cavity, a motor housing, a computer monitor, a control panel, or some other device. Such programming on an operating coating line requires the coating line to be out of production. The programming process can take a very long time, sometimes hours, even days, and sometimes even weeks or longer to obtain a desired programming to carry out acceptable uniform coating.

One example of using a robot to coat an object is in a spray painting device used to spray a desired coating on the inside of an oven cavity. Typically the coating should be uniform. However, as the tool, such as the paint spray head, comes to a junction of two oven walls, excess paint may be applied as the paint head finishes one move along one wall toward the junction and then commences moving along the adjacent wall from the junction. To avoid excess paint accumulation, the spray volume may be reduced as the spray head reaches the junction and then increased as the spray head moves away from the junction. In conventional robotic machines using the teach pendant system, it is necessary for a skilled technician to work jointly with the painter, i.e., the person who operates the paint spraying robot equipment, to work together to make the final adjustments and do the programming. Thus, not only does it take substantial time to carry out the programming functions, but also additional personnel are required, thus, further adding to the cost for carrying out the coating process due to set up of the machine, and making adjustments from time to time as materials and conditions change, e.g., viscosity of material may change with temperature of the ambient surroundings and affect the coating, etc. There is a need in the art to reduce the time, effort and cost to set up a coating machine or the like and/or to program robots to carry out various functions. Plus, there is a need to reduce the number of persons and time required for the aforementioned programming adjustments, etc., and there also is a need to facilitate such programming and adjustments so that a painter, for example, will be able to make necessary adjustments without the need to call in a separate technician.

Accordingly, it would be desirable to develop an automated coating process wherein the robot motion is generated automatically based on the shape of the object, without the requirements for specialized robotic programming skills.

The above examples of robotics with respect to coating machines and the need for various improvements also apply to robotics as used with other instruments and so called effectuators or effectors, and, as is described below the present invention is applicable to all of these uses of robotics and the interfacing of robots and controls therefore with facile controls, control systems, interfaces and the like.

SUMMARY

A method for generating a process trajectory is described, the method, comprising displaying a normalized image of an object on a display device of a computer system, the object including a surface that is to be processed using an end effector; providing a number of predefined trajectories in a memory of the computer system, each of the predefined trajectories defining a motion of the end effector to process a surface of one of a number of spatial definitions; and generating the process trajectory for the end effector to process the surface of the object by associating at least one of the predefined trajectories with the normalized image.

In another embodiment, the present invention provides for a program embodied in a computer-readable medium for generating a process trajectory, comprising code that generates a display of a normalized image of an object on a display device, the object including a surface that is to be processed using an end effector; a number of predefined trajectories, each of the predefined trajectories defining a motion of the end effector to process a surface of one of a number of spatial definitions; and code that generates the process trajectory for the end effector to process the surface of the object by facilitating an association of at least one of the predefined trajectories with the normalized image.

In yet another embodiment, the present invention provides for a system for generating a process trajectory, comprising a processor circuit having a processor and a memory; a trajectory generation system stored in the memory and executable by the processor. The trajectory generation system further comprises logic that generates a display of a normalized image of an object on a display device, the object including a surface that is to be processed using an end effector; a number of predefined trajectories, each of the predefined trajectories defining a motion of the end effector to process a surface of one of a number of spatial definitions; and logic that generates the process trajectory for the end effector to process the surface of the object by facilitating an association of at least one of the predefined trajectories with the normalized image.

In still another embodiment, the present invention provides for a system for generating a process trajectory, comprising means for displaying a normalized image of an object on a display device of a computer system, the object including a surface that is to be processed using an end effector; means for storing a number of predefined trajectories, each of the predefined trajectories defining a motion of the end effector to process a surface of one of a number of spatial definitions; and means for generating the process trajectory for the end effector to process the surface of the object by associating at least one of the predefined trajectories with the normalized image.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIGS. 2A and 2B are drawings that illustrate examples of predefined reciprocating trajectories that are employed by the trajectory generation system of FIG. 1 to generate the process trajectory according to an embodiment of the present invention;

FIGS. 3A and 3B are drawings that illustrate examples of two orientations of a predefined box trajectory that may be employed by the trajectory generation system of FIG. 1 to generate the process trajectory according to an embodiment of the present invention;

FIGS. 4A and 4B are drawings that illustrate examples of two orientations of a predefined concave trajectory that may be employed by the trajectory generation system of FIG. 1 to generate the process trajectory according to an embodiment of the present invention;

FIG. 5 is a drawing that illustrates an example of a predefined cylindrical trajectory that may be employed by the trajectory generation system of FIG. 1 to generate the process trajectory according to an embodiment of the present invention;

FIG. 6 is a drawing that illustrates an example of a predefined conical trajectory that may be employed by the trajectory generation system of FIG. 1 to generate the process trajectory according to an embodiment of the present invention;

FIG. 7 is a drawing that illustrates an example of a predefined perimeter trajectory that may be employed by the trajectory generation system of FIG. 1 to generate the process trajectory according to an embodiment of the present invention;

DETAILED DESCRIPTION

Figure 1:
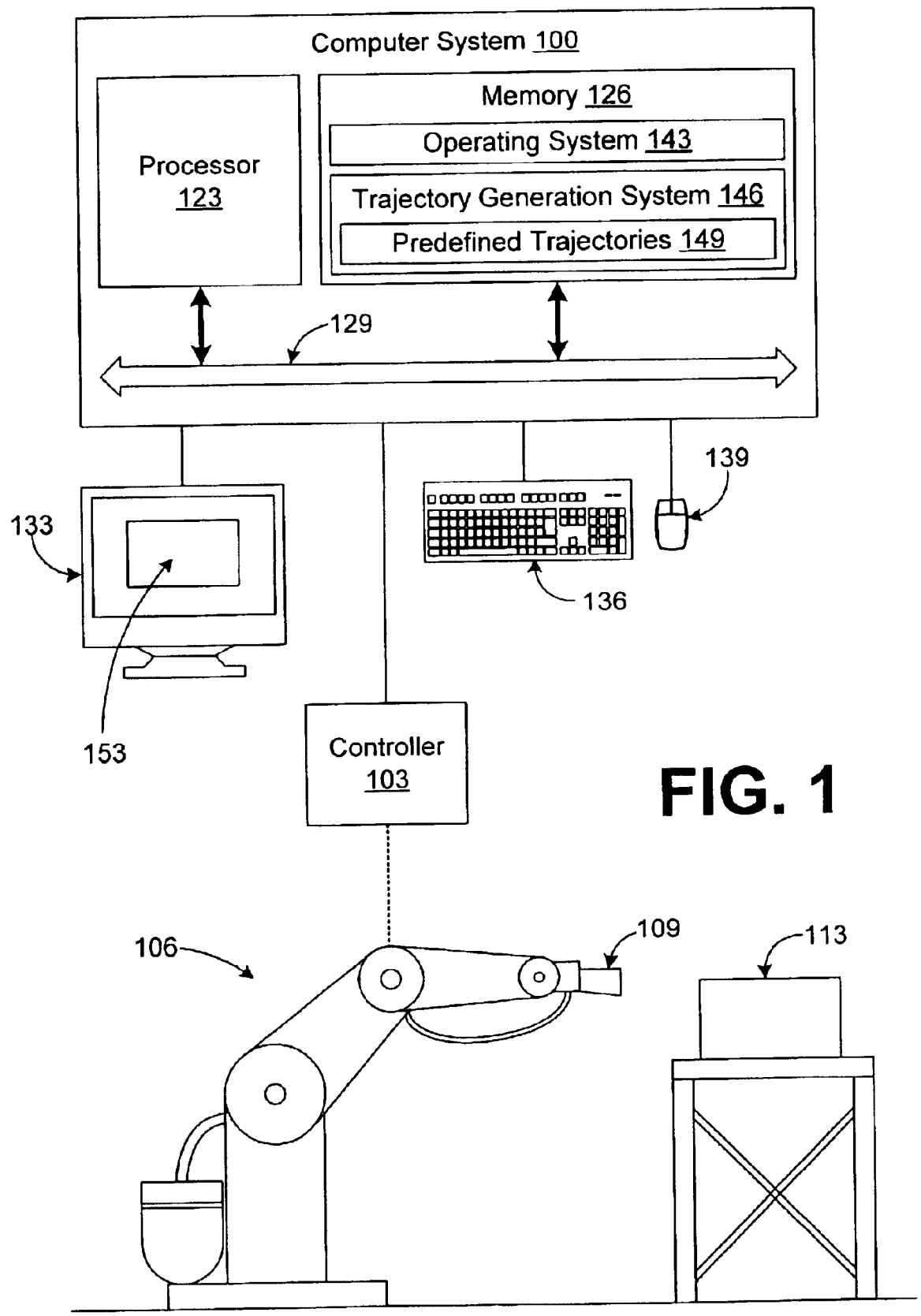
FIG. 1 is a block diagram that illustrates a trajectory generation system on a computer system that interfaces with a controller that controls a machine that positions and moves an end effector according to a process trajectory according to an embodiment of the present invention.

With reference to FIG. 1, shown is an interconnection of devices that are employed to accomplish a controlled movement of an end effector using a machine such as a robotic arm or other such device. Among the devices shown in figure one are a computer system 100, a controller 103, and a robotic arm 106. The controller 103 initiates movement of several different actuators on the robot arm 106 to cause the controlled movement of an end effector 109 attached to the robotic arm 106. The end effector 106 may be, for example, a spray gun, a buffer, a welder, or other such device that is employed to process a surface of a target object 113 such as a part, etc. The controller 103 may be, for example, one of any number of controllers that are available on the market to control the operation of the robot arm 106 or other apparatus such as, for example, controllers made by Galil™, Trellis™, Adept™, Delta Tau™, ABB Robotics™, and other manufacturers.

The computer system 100 includes a processor circuit having a processor 123 and a memory 126, both of which are coupled to a local interface 129. In this respect, the computer system 100 may be, for example, any general-purpose computer system or other device with like capability. The computer system 100 also includes a display device 133, a keyboard 136, and a mouse 139 that are all coupled to the local interface 129 with appropriate interface cards or other such devices as can be appreciated by those of ordinary skill in the art. In addition, other peripheral devices may be employed with the computer system 100 including, for example, a keypad, touch pad, touch screen, microphone, scanner, joystick, or one or more push buttons, etc. The peripheral devices may also include indicator lights, speakers, printers, etc. The display device 133 may be, for example, a cathode ray tube (CRT), liquid crystal display screen, gas plasma-based flat panel display, or other type of display device, etc.

Stored in the memory 126 and executable by the processor 123 are software components such as an operating system 143 and a trajectory generation system 146. The trajectory generation system 146 is executed by the processor 123 in order to generate a process trajectory that is to be applied to the controller 103 to cause the robot arm 106 to move the end effector 109 in the desired manner to process the object 113 as will be described in detail. In generating the process trajectory, the trajectory generation system 146 employs one or more predefined trajectories 149 and generates one more user interfaces 153 on the display device 133. In this respect, a user may manipulate the user interfaces 153 displayed on the display device 133 by manipulating the keyboard 136 and the mouse 139 as can be appreciated by those with ordinary skill in the art.

In addition, the memory 126 is defined herein as both volatile and nonvolatile memory and data storage components. Volatile components are those that do not retain data values upon loss of power. Nonvolatile components are those that retain data upon a loss of power. Thus, the memory 126 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices, The ROM may comprise, for example, a programmable read-only memory (PROM), an erasable programmable read-only memory (EPROM), an electrically erasable programmable read-only memory (EEPROM), or other like memory device.

Also, the processor 123 may represent multiple processors and the memory 126 may represent multiple memories that operate in parallel. In such a case, the local interface 129 may be an appropriate network that facilitates communication between any two of the multiple processors, between any processor and any one of the memories, or between any two of the memories etc. The processor 123 may be electrical, optical, or molecular in nature.

The operating system 143 is executed to control the allocation and usage of hardware resources in the computer system 100 such as the memory, processing time and peripheral devices. In this manner, the operating system 143 serves as the foundation on which applications depend as is generally known by those with ordinary skill in the art.

With reference to FIG. 2A, shown is an exemplary surface area 113a that is overlaid with a reciprocating trajectory 149a according to an embodiment of present invention. The reciprocating trajectory 149a "reciprocates" over the surface area 113a and that it progresses back and forth in a repetitive manner across the surface area 113a. In this respect, the surface area 113a is actually a type of object 113 (FIG. 1) that is processed using the end effector 109. The reciprocating trajectory 149a includes a lead-in portion 163 and a lead-out portion 166 where the end effector 109 is not engaged with the surface area 113a. Another feature of the reciprocating trajectory 149a is that a distance X exists between each of the passes across the surface area 113a.

Referring then to FIG. 2B, shown is a second reciprocating trajectory 149b according to another embodiment of the present invention. The second reciprocating trajectory 149b includes a number of passes over the surface area 113a in a zigzag pattern. This contrasts with the reciprocating trajectory 149a (FIG. 2A) that is in the form of a square wave has appreciated by those with ordinary skill in the art. According to an aspect of the present invention, the various predefined trajectories 149 (FIG. 1) may employ square waves or zigzag patterns as will be apparent.

Turning then to FIG. 3A, shown is a further example of a predefined trajectory 149c according to another embodiment of the present invention. The predefined trajectory 149c is a "Box" trajectory and that it provides for an ability to paint, coat, weld, buff, or otherwise process an object that is shaped like a box. In a particular, the box trajectory 149c may be used to process either the inside or outside of a box structure. In this regard, the end effector 109 is either pointed toward the inside or the outside the box structure as it progresses through the box trajectory 149c. The box trajectory 149c of FIG. 3A illustrates a horizontal configuration. With reference to FIG. 3B, a further illustration of a box trajectory 149d is provided. As shown, the box trajectory 149 is in a vertical configuration.

With reference to FIGS. 4A and 4B, shown is a predefined trajectory 149e to be employed in processing concave objects 113b according to another embodiment of the present invention. The concave trajectory 149e includes multiple concentric circles that address different levels within the concave object 113b. In addition, FIG. 5 illustrates a predefined "cylindrical" trajectory 149f that is employed to process either the inside or outside of a cylinder. Also, FIG. 6 illustrates a predefined "conical" trajectory 149g that is employed to process either the inside or outside of a cone. An object 113 that is shaped like a cone may also be processed using a predefined trajectory similar to that employed for a concave object 113b (FIG. 4A) as described above. In FIG. 7, a predefined "perimeter" trajectory 149h is shown that is employed to process around a perimeter of an object 113c as shown.

In addition, there is no limit to the types of predefined trajectories 149 that may be defined and stored in the memory 126 (FIG. 1), whereas those discussed herein are provided merely as examples. For example, predefined trajectories may be in the form polygons, randomly generated lines, or lines that conform to other shapes beyond those specifically discussed herein.

Referring back to FIG. 1, in light of the foregoing discussion of the predefined trajectories 149 above, a general discussion of the operation of the trajectory generation system 146 is provided. Assume that a user wishes to create a process trajectory that is to be programmed into the controller 103 so that the robot arm 106 or other device may be manipulated to cause the end effector 109 to trace along the process trajectory to process the object 113 accordingly. Prior art systems may require the user to employ a teach pendant to generate the process trajectory that is ultimately applied to the controller 103. However, such a process can be time consuming and expensive.

However, the present invention greatly reduces the time it takes to generate the process trajectory. First, the user obtains a digital image of the object 113 either using a digital camera or other digital image producing device. The user accesses the digital image with the trajectory generation system 146. At this point, the digital image is "non-normalized" in that the trajectory generation system 146 has no knowledge of the actual dimensions or size of the object 113 depicted therein. Once the digital image of the object 113 is accessed, it is calibrated so that the trajectory generation system 146 knows the dimensions of the object 113 depicted therein. This may be done, for example, by identifying two points on the digital image as it is displayed on the display device and entering the distance therebetween. Once the calibration is complete, then the digital image is "normalized".

At this point, the user may manipulate the various user interface components generated by the trajectory generation system 146 to create the process trajectory over the digital image. Specifically, the trajectory generation system 146 facilitates the superimposition of the process trajectory over the normalized digital image. It may be the case that the object 113 depicted in the digital image includes portions that match one or more predefined trajectories that are stored as part of the trajectory generation system 146. The trajectory generation system 146 provides for the "fitting" of such predefined trajectories onto such portions the digital image by superimposition. In circumstances where the predefined trajectories 149 are three dimensional, the user may be required to enter depth information as well as other parameters as is appropriate. For example, the orientation of the end effector 109 as it travels along a predefined trajectory 149 may be specified. Also, the user may add transition trajectories that allow the end effector 109 to be moved between consecutive predefined trajectories 149 or other trajectory components added to the digital image by the user.

Once the generation of the process trajectory is complete, the trajectory generation system 146 translates the process trajectory into a language that is native to the specific controller 103 that is employed by the user. The resulting data file is downloaded to the controller 103 and may be employed thereafter to manipulate the robot arm 106 or other device to move the end effector 109 according to the process trajectory.

In this manner, the use of teach pendants and other prior art approaches are avoided. Also, the process trajectory can be generated without interrupting the operation of the robotic arm 106 or other apparatus that may already be employed in an assembly line or other manufacturing process. Essentially, the process trajectory may be generated "off-line", thereby saving time and expense, etc. In addition, the trajectory generation system 146 provides an easy to use interface that is based upon an image of the object to be processed. This is advantageous as personnel may create the process trajectory with a minimum of training.

Figure 8:
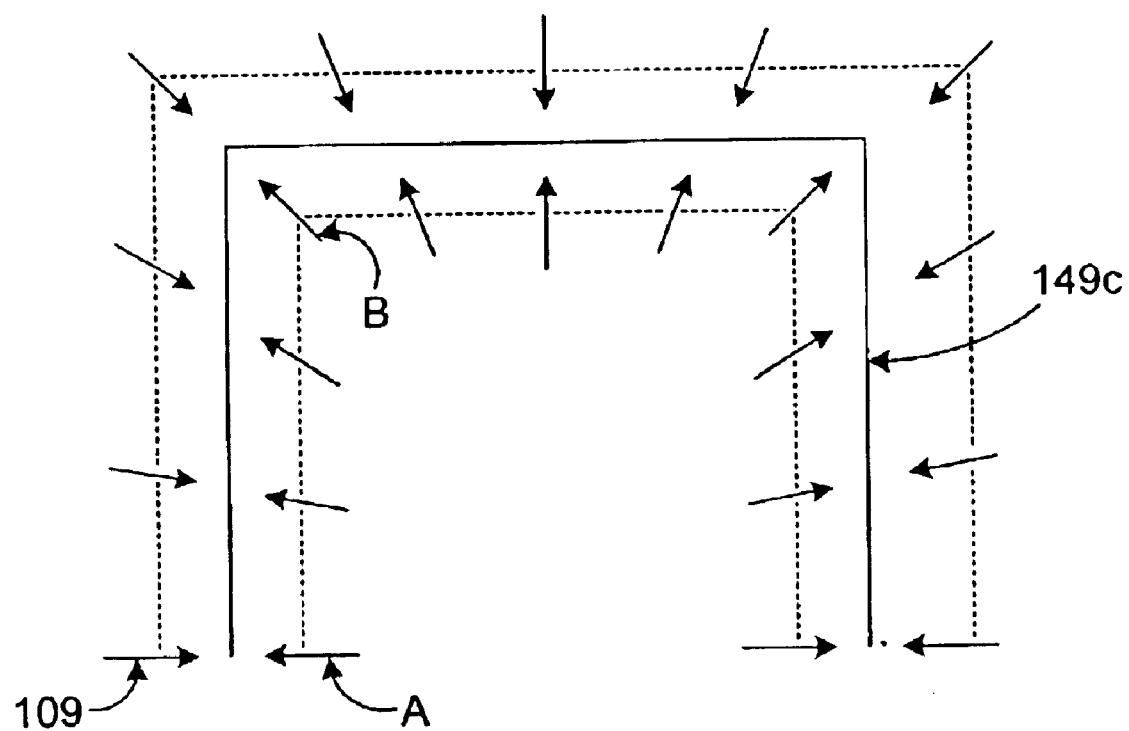
FIG. 8 is a drawing that illustrates an exemplary orientation transition of an end effector along a box trajectory according to an embodiment of the present invention.

With reference to FIG. 8, shown is a top view of the predefined "box" trajectory 149c of FIG. 3A. The top view of the predefined box trajectory 149c shows a position and orientation of the end effector 109 (FIG. 1) as it progresses along the predefined trajectory 149c for both inside and outside of the box structure. In this sense, the "box" is a spatial definition that is processed on either an inner or outer surface as shown. The predefined trajectory 149c also illustrates an orientation transition of the end effector 109. Specifically, at a first position A the end effector 109 is orthogonal to the surface being processed. At position B, the end effector 109 is oriented at 45° relative to the same surface as it reaches the corner as shown. This is the case regardless of whether the predefined trajectory 149c is inside or outside the spatial definition. Thus, the predefined trajectory 149c includes orientation information that is interpreted to orient the end effector 109 relative to the spatial definition as it progresses along the predefined trajectory 149c.

The orientation of the end effector 149c may be a specified as a fixed orientation where the end effector 109 does not change along the predefined trajectory 149c. Alternatively, a predefined trajectory 149c may include an orientation transition in which the orientation of the end effector 109 changes as the end effector 149c moves along the predefined trajectory 149c. In addition, the trajectory generation system 146 facilitates a user specification of the orientation along any particular predefined trajectory 149 (FIG. 1) as will be described. Thus, the end effector 109 may be oriented in any direction as is appropriate. Each of the predefined trajectories 149 includes a default orientation and/or orientation transitions as is appropriate. The trajectory generation system 146 facilitates a user modification of the default orientation and/or orientation transitions to suit particular needs when creating a particular process trajectory.

Figure 9:
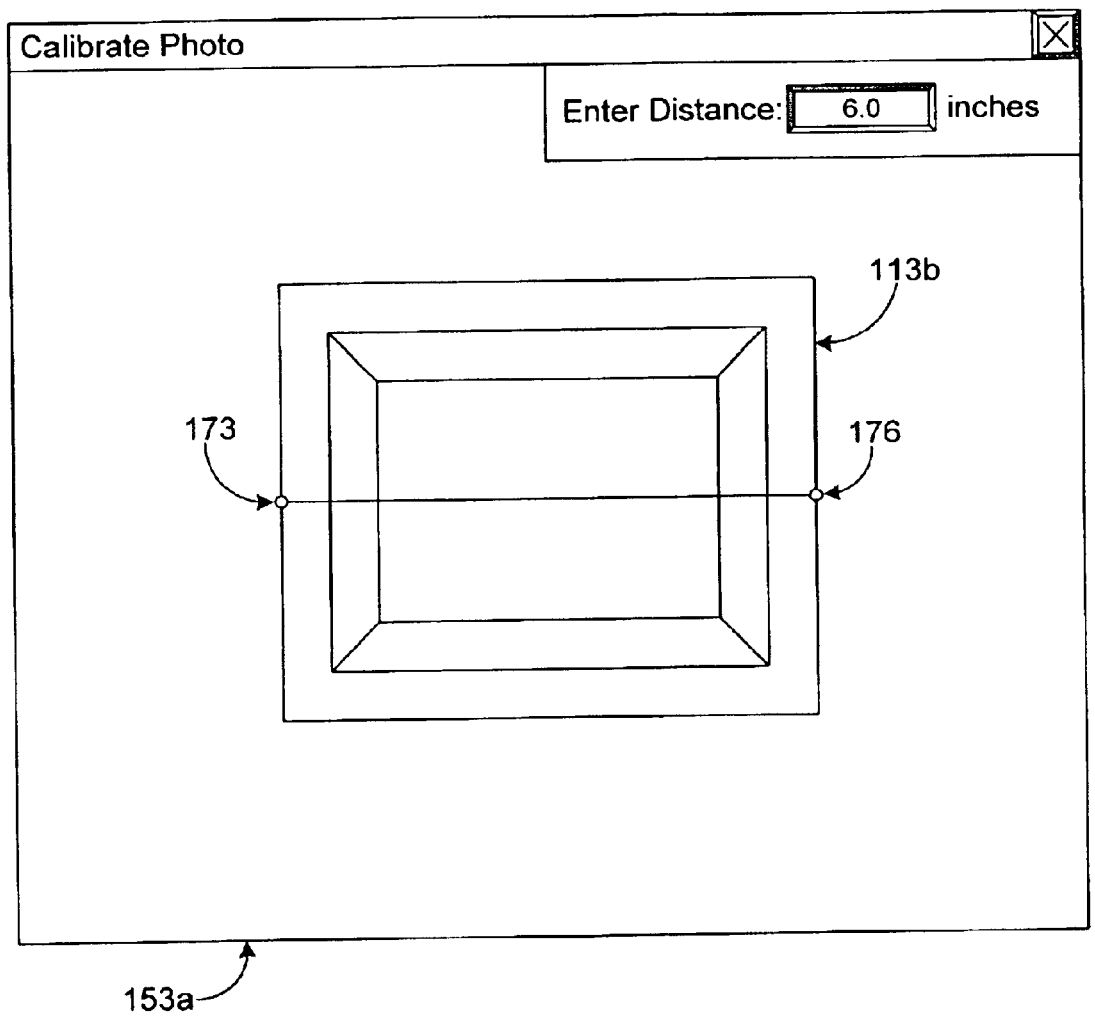
FIG. 9 is a drawing of an exemplary user interface employed to calibrate a non-normalized image of an object for which the process trajectory is to be generated by the trajectory generation system of FIG. 1 according to an embodiment of the present invention.

Referring next to FIG. 9, shown is an exemplary user interface 153a according to an embodiment of the present invention. The user interface 153a includes a digital image of an object in the form of a box cavity 113b. Initially, the digital image is non-normalized as it is not calibrated. Specifically, the trajectory generation system 146 has no knowledge of the relative size of the box cavity 113b within the digital image. As far as the trajectory generation system 146 is concerned, the box cavity could be any size whether it is as small as a matchbox to as big as a house and beyond, etc. The user interface 153a generated by the trajectory generation system 146 provides for the calibration of the digital image to provide the trajectory generation system 146 with the relative size of the box cavity 113b included therein.

In order to calibrate the digital image, a user specifies a first point 173 and a second point 176 on the digital image. This may be done, for example, by positioning a cursor over such locations and clicking thereon with the mouse 139 or other input device. Once the first and second points 173 and 176 are identified on the digital image, then a distance between the first and second points 173 and 176 is entered in a distance field 179. By virtue of the distance entered, the digital image is normalized in that the trajectory generation system 146 can then determine the distance between any two points identified in the digital image. It is understood that the user interface 153 is shown merely as an example and that other interfaces that employ different input mechanisms and have a different appearance may be employed to accomplish the calibration function described above.

Figure 10:
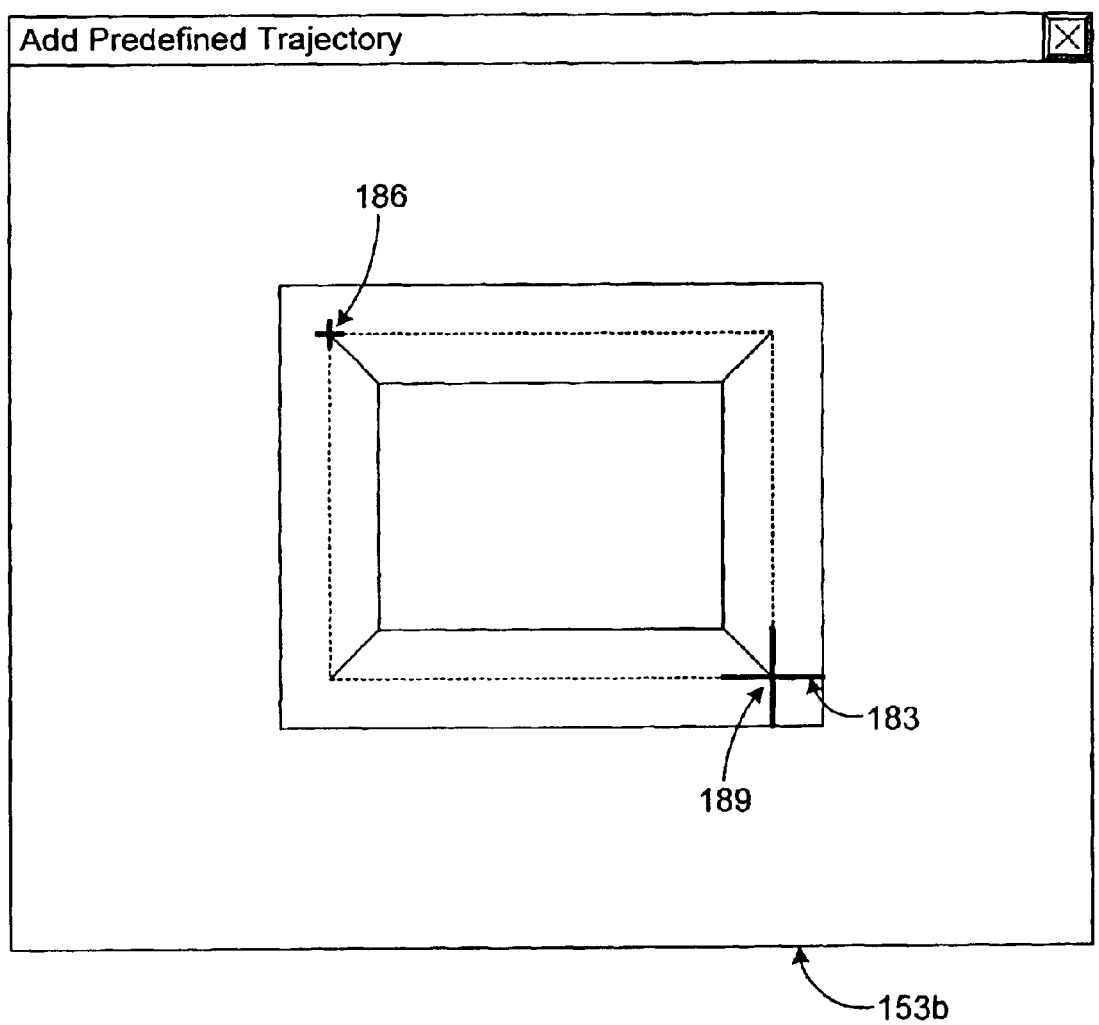
FIG. 10 is a drawing of an exemplary user interface employed to fit a predefined trajectory to a normalized image of an object for which the process trajectory is to be generated by the trajectory generation system of FIG. 1 according to an embodiment of the present invention.

Referring next to FIG. 10, shown is an example of a second user interface 153b according to another embodiment of the present invention. The second user interface 153b provides for the "fitting" or superimposition of a predefined trajectory 149 (FIG. 1) onto the digital image. In this respect, the second user interface 153b depicts the digital image similar to FIG. 9 described above. Assume, for example, that the user wishes to create a box trajectory to process the inside of the box cavity of the object 113b. To do so, the user may select the predefined "box" trajectory from the available predefined trajectories 149 offered by the trajectory generation system 146 (FIG. 1) by manipulating various interface components (not shown). Once selected, the user may position a cursor 183 and click and drag the cursor from a first position 186 on the digital image over to a second position 189 as shown. The predefined box trajectory 149c is fitted within the box that remains.

Thereafter, a subsequent user interface appears on the display device 133 that provides for a user modification and/or specification of parameters associated with the newly added predefined trajectory 149. While the above discussion of FIG. 10 relates to a predefined "box" trajectory 149c, it is understood that the same discussion applies to other shapes depending upon the nature of the portion of the object 113 to be processed by the end effector 109 (FIG. 1). In addition, the user may add other components to the process trajectory such as transition trajectories between two or more predefined trajectories 149 or other trajectory components.

Figure 11:
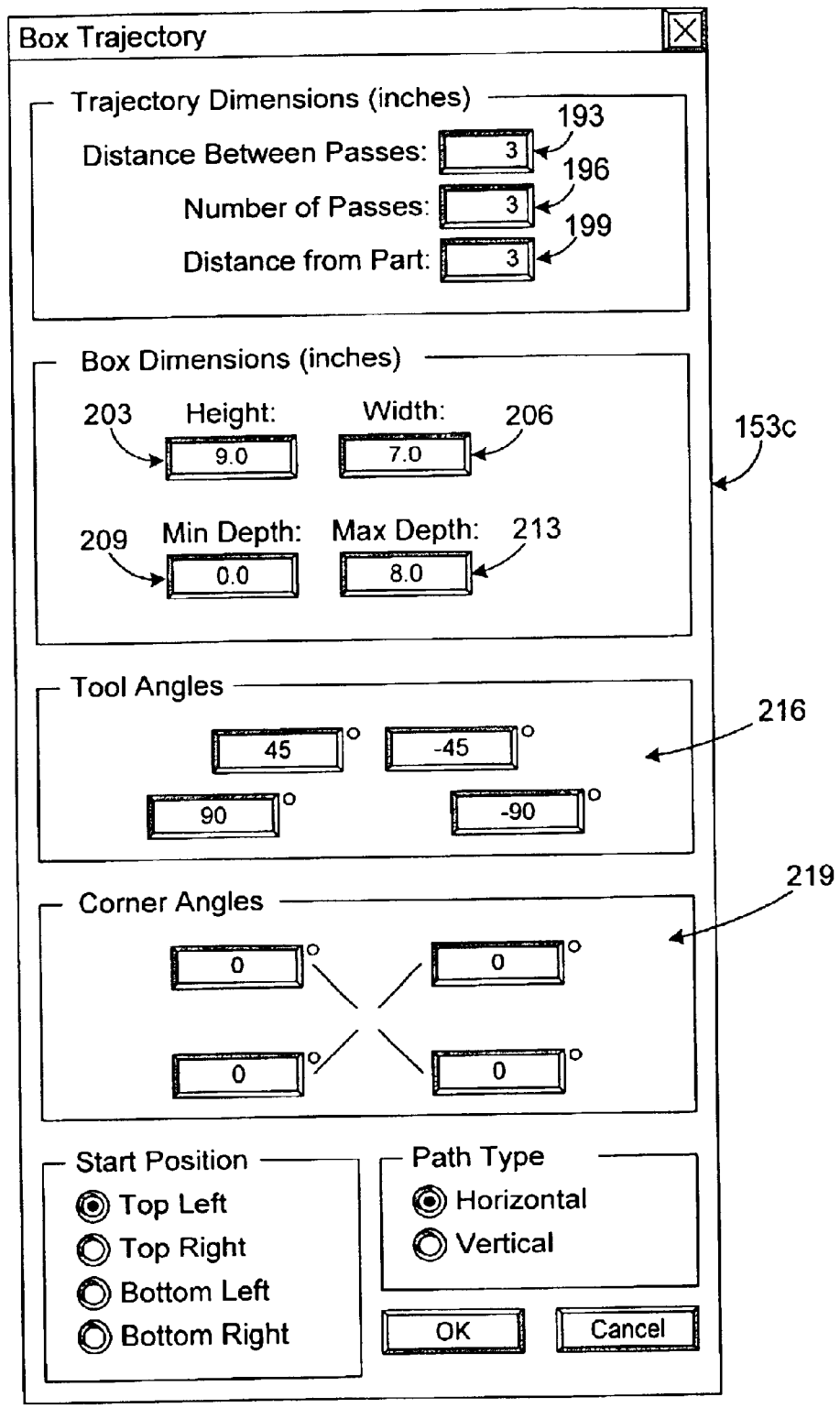
FIG. 11 is a is a drawing of an exemplary user interface employed to specify various parameters and/or settings associated with an exemplary predefined box trajectory that may be included within the process trajectory generated by the trajectory generation system of FIG. 1 according to an embodiment of the present invention.

Referring next to FIG. 11, shown is an example of a third user interface 153c that is generated by the trajectory generation system 146 (FIG. 1) in response to the superimposition of a predefined trajectory 149 (FIG. 1) over the digital image as described with reference to FIG. 10. The exemplary third user interface 153c provides a user with an opportunity to specify or modify default parameters associated with the predefined trajectory 149. In this respect, the third user interface 153c specifies the parameters associated with a predefined "box" trajectory 149c, although it is understood that user interfaces may be generated for any type of predefined trajectory 149 to provide the needed parameters to properly specify the ultimate process trajectory created.

By way of example, the third user interface 153c includes a "Distance Between Passes" field 193, a "Number of Passes" field 196, and a "Distance from Part" field 199. The "Distance Between Passes" field 193 allows a user to specify the specific distance between the passes of a predefined trajectory 149. This is done, for example, so that a user may ensure that there is no overlap between passes for a particular process where such an overlap would be undesirable such as, for example, in a coating process, etc. A default distance between passes is initially calculated by the trajectory generation system 146 that may be modified by the user in the third user interface. The "Distance Between Passes" field 193 or its equivalent may be employed with regard to other types of predefined trajectories 149 beyond a box trajectory.

The "Number of Passes" field 196 allows a user to specify the number of passes to be included in the predefined trajectory 149 and the "Distance from Part" field 199 allows a user to specify how far away from the object 113 (FIG. 1) that the end effector 109 (FIG. 1) be located along the predefined trajectory 149. The trajectory generation system 146 initially calculates default values for the "Number of Passes" field 196 and the "Distance from Part" field 199 that are then displayed in the third user interface 153c. The "Number of Passes" field 196 and the "Distance from Part" field 199 or their equivalents may be employed with regard to other types of predefined trajectories 149 beyond a box trajectory. In addition, the "Number of Passes" field 196 may apply along with other appropriate fields to a predetermined trajectory in a zigzag format.

The third user interface provides for the modification of dimensional parameters relating to the predetermined "box" trajectory 149c with various fields such as a height field 203, a width field 206, a minimum depth field 209, and a maximum depth field 213. The height and width fields 203 and 206 specify values for the height and width of the box generated on the second user interface 153b. The trajectory generation system 146 initially calculates the height and width of the predefined trajectory 149, given that the digital image has been normalized. The user may alter these parameters accordingly. In the case of other types of predefined trajectories 149, other values beyond a height and a width may be specified such as, for example, a radius, circumference, area, or other parameter.

The minimum depth field 209 and the maximum depth field 213 refer to various dimensions of the object 113 not illustrated in the two-dimensional digital image of the object, etc. For example, the minimum depth field 209 may be a depth of the front side of a predefined trajectory 149 and the maximum depth field 213 would refer to a depth of a rear side of the predefined trajectory 149 relative to a predetermined coordinate system.

In addition, the third user interface 153c includes various tool angle fields 216 that specify an angle or orientation of the end effector 109 at predetermined points along the predefined trajectory 149. In the example of FIG. 11, the angles are those that indicate the orientation of the end effector 109 as it traces along the box trajectory 149c as described with reference to FIG. 8. The values entered in the tool angle fields thus provide a user with the ability to specify the orientation of the end effector 109 in a first dimensional plane and to specify an orientation transition of the end effector 109 along the predefined trajectory. Likewise, the corner angles 219 provide further orientation of the end effector 109 in a third dimension in the passes on either end of the predefined box trajectory 149c. Thus, the end effector 109 can be made to point upward and downward for the end passes to properly address corners, etc. In a like manner, the orientation of the end effector 109 along any type of trajectory may be specified.

In addition, the third user interface 153c also provides for user specification of the start position of the end effector 109 on the predefined trajectory 149 and the particular orientation of the predefined trajectory 149 selected. Similar orientation of any other predefined trajectories 149 other than a box trajectory may be specified by users in other appropriate user interfaces, etc.

Figure 12:
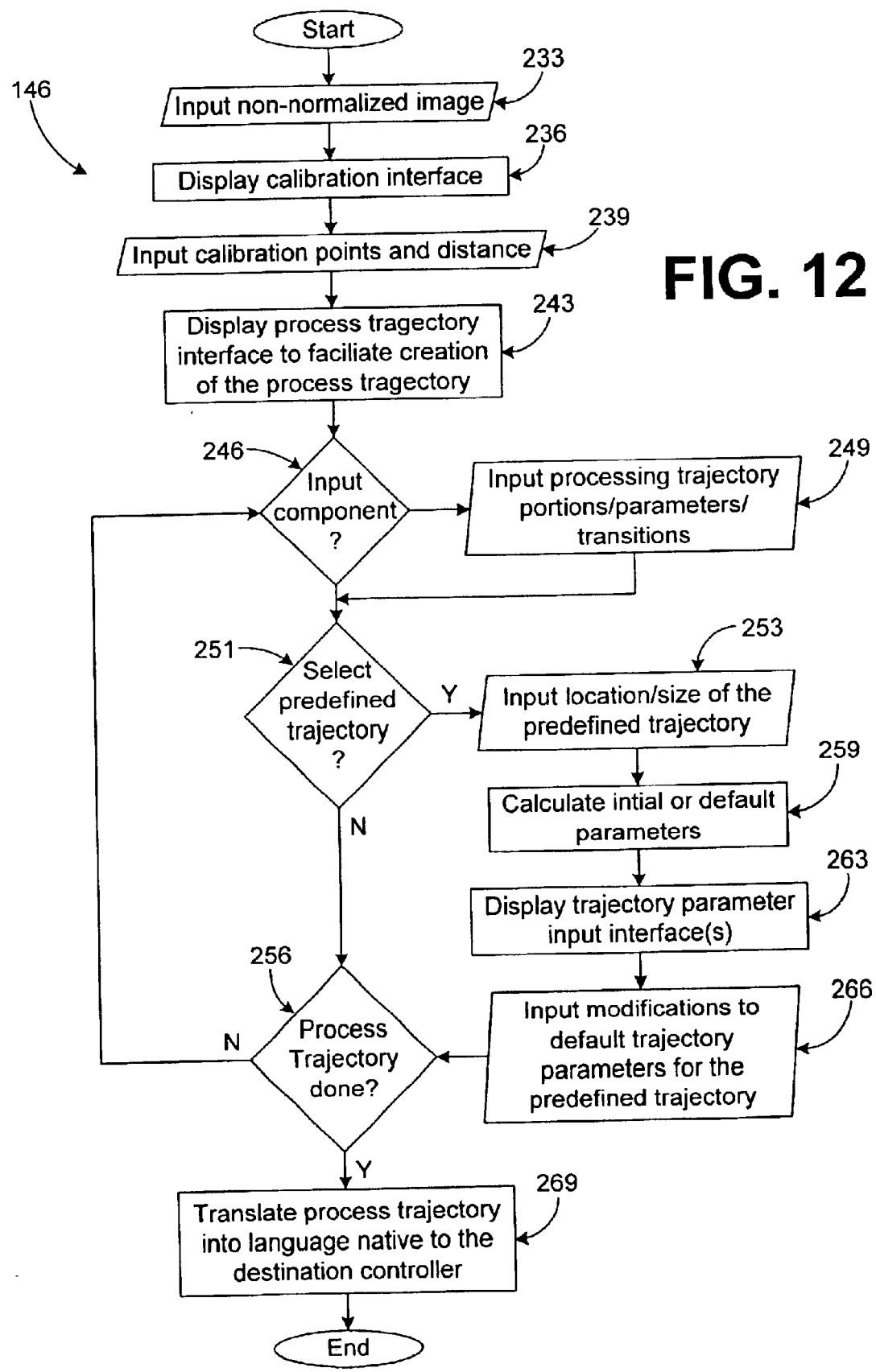
FIG. 12 is an exemplary flow chart the trajectory generation system of FIG. 1 according to an embodiment of the present invention.

Turning then to FIG. 12, shown is an exemplary flow chart that depicts the operation of the trajectory generation system 146 according to an aspect of the present invention. Alternatively, the flow chart of FIG. 12 may be viewed as depicting steps of a method implemented in the computers system 100 (FIG. 1) to generate a process trajectory that is applied to the controller 103 (FIG. 1).

While the trajectory generation system 146 is described in terms of the flow chart of FIG. 12, it is understood that the same may be implemented in terms of an object oriented design with various modules, objects, or other groupings or encapsulations of underlying functionality as implemented in programming code with an operation that may differ from the flow indicated in FIG. 12. It is understood that the implementation of the underlying functionality described in FIG. 12 in such a manner remains within the scope of the present invention, where the choice to employ an object oriented design or other design or architecture is merely an implementation issue.

Beginning with input box 233, a user inputs a non-normalized image of an object 113 (FIG. 1) for which a process trajectory is desired. This may be done, for example, by generating user interfaces that facilitate a selection of the non-normalized image from a particular directory in the memory 126 of the computer system 100, etc. Thereafter, in box 236, the first user interface 153a is generated on the display device 133 (FIG. 1) to facilitate the calibration of the non-normalized image. Then, in box 239 the trajectory generation system 146 inputs the first and second points 173 and 176, and the distance therebetween. Next, in box 243 the second user interface 153b (FIG. 10) or its equivalent is displayed to facilitate the creation of the process trajectory.

Thereafter, in box 246 the trajectory generation system 146 determines whether a component of the process trajectory currently being configured is to be input by the user based upon an manipulation of an appropriate user interface component. If so, then the trajectory generation system 146 proceeds to box 249. Otherwise the trajectory generation system 146 moves to box 251. In box 249, the trajectory generation system 146 inputs various process trajectory portions, parameters, and transition trajectories as is appropriate. Thereafter, the trajectory generation system 146 proceeds to box 251.

In box 251, the trajectory generation system 146 determines whether the user has selected a predefined trajectory 149 (FIG. 1) to add to the process trajectory. If so, then the trajectory generation system 146 proceeds to box 253. The selection of a predefined trajectory 149 may be accomplished using any one of a number of user interface devices such as, for example, a drop down menu, a pick list, or other interface device. If a predefined trajectory 149 was not selected, then the trajectory generation system 146 continues to box 256. Assuming that a predefined trajectory 149 has been selected, then in box 253 the trajectory generation system 146 inputs the location and size of the predefined trajectory 149 by virtue of a user manipulation of the second user interface 153b discussed with reference to FIG. 10.

Thereafter, in box 259, the default or initial parameters associated with the newly inputted predefined trajectory 149 are calculated. Then, in box to 263 the third user interface 153c or its equivalent for the specific predefined trajectory 149 is displayed on the display device 133 (FIG. 1). Next, in box 266 the trajectory generation system 146 inputs any modifications to the default parameters for the predefined trajectory 149.

Thereafter, in box 256, the trajectory generation system 146 determines whether the process trajectory is complete. This may be determined by detecting whether the user has manipulated an interface component such as a push button or other user interface component that indicates that the process trajectory is complete. If the process trajectory is not complete, then the trajectory generation system 146 reverts back to box 246. Thus, the trajectory generation system 146 ultimately waits for a user action in generating the process trajectory in boxes 246, 251, and 256 and takes appropriate action based on user input. The trajectory generation system 146 can also be interrupted from this pattern by other action not discussed herein such as a predefined interrupt, etc.

Assuming that the process trajectory is complete in box 256, then the trajectory generation system 146 proceeds to box 269 in which the process trajectory is translated into the control language native to the respective destination controller 103. Thereafter, the trajectory generation system 146 ends as shown. The resulting process trajectory embodied in the control language native to the destination controller 103 may then be downloaded to the controller 103 and motion by the end effector 109 may be commenced.

Although the trajectory generation system 146 is embodied in software or code executed by general purpose hardware as discussed above, as an alternative the same may also be embodied in dedicated hardware or a combination of software/general purpose hardware and dedicated hardware. If embodied in dedicated hardware, the trajectory generation system 146 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 12 shows the architecture, functionality, and operation of an implementation of the trajectory generation system 146. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 12 shows a specific order of execution, it is understood that the order of execution may differ from that which is depicted. For example, the order of execution of two or more blocks may be scrambled relative to the order shown. Also, two or more blocks shown in succession in FIG. 12 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the trajectory generation system 146 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the trajectory generation system 146 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for generating a process trajectory, comprising:

displaying a normalized image of an object on a display device of a computer system, the object including a surface that is to be processed using an end effector;

providing a number of predefined trajectories in a memory of the computer system, each of the predefined trajectories defining a motion of the end effector to process a surface of one of a number of spatial definitions;

generating the process trajectory for the end effector to process the surface of the object by associating at least one of the predefined trajectories with the normalized image.

2. The method of claim 1, further comprising:

displaying a non-normalized version of the image on the display device; and calibrating the non-normalized version of the image on the display device, thereby generating the normalized image.

3. The method of claim 2, wherein the calibrating of the non-normalized version of the image on the display device further comprises:

identifying a first point and a second point on the non-normalized version of the image on the display device; and entering a distance between the first and second points into the computer system.

4. The method of claim 1, wherein the providing of the number of predefined trajectories in the memory of the computer system further comprises providing for a predefined trajectory that is in the shape of a box.

5. The method of claim 1, wherein the providing of the number of predefined trajectories in the memory of the computer system further comprises providing for a predefined trajectory that is in the shape of a concave surface.

6. The method of claim 1, wherein the providing of the number of predefined trajectories in the memory of the computer system further comprises providing for a predefined trajectory that is in the shape of a cylinder.

7. The method of claim 1, wherein the providing of the number of predefined trajectories in the memory of the computer system further comprises providing for a reciprocation trajectory.

8. The method of claim 1, wherein the providing of the number of predefined trajectories in the memory of the computer system further comprises providing for a predefined trajectory that is in the shape of a cone.

9. The method of claim 1, wherein the providing of the number of predefined trajectories in the memory of the computer system further comprises providing for a predefined trajectory that is in the shape of a polygon.

10. The method of claim 1, wherein the providing of the number of predefined trajectories in the memory of the computer system further comprises defining an orientation transition of the end effector at least one of the predefined trajectories.

11. The method of claim 1, wherein the providing of the number of predefined trajectories in the memory of the computer system further comprises defining an orientation of the end effector along at least one of the predefined trajectories.

12. The method of claim 11, further comprising providing for a user specification of the orientation of the end effector along at least one of the predefined trajectories.

13. The method of claim 1, wherein the generating of the process trajectory for the end effector to process the surface of the object by associating at least one of the predefined trajectories with the normalized image further comprises: associating a number of the predefined trajectories with the normalized image; providing for a transition trajectory between consecutive ones of the predefined trajectories.

14. The method of claim 1, wherein the generating of the process trajectory for the end effector to process the surface of the object by associating at least one of the predefined trajectories with the normalized image further comprises fitting the at least one of the predefined trajectories to a portion of the normalized image displayed on the display device.

15. The method of claim 14, wherein the fitting of the at least one of the predefined trajectories to a portion of the normalized image displayed on the display device further comprises fitting the at least one of the predefined trajectories to the object displayed on the display device in two dimensions.

16. The method of claim 14, further comprising configuring the at least one of the trajectories by entering a depth of the at least one predefined trajectories into the computer system.

17. The method of claim 14, further comprising configuring the at least one predefined trajectories by entering a distance between a number of passes in the at least one predefined trajectories into the computer system.

18. The method of claim 14, further comprising configuring the at least one predefined trajectories by entering a number of passes of the at least one predefined trajectories into the computer system.

19. A program embodied in a computer-readable medium for generating a process trajectory, comprising:

code that generates a display of a normalized image of an object on a display device, the object including a surface that is to be processed using an end effector;

a number of predefined trajectories, each of the predefined trajectories defining a motion of the end effector to process a surface of one of a number of spatial definitions;

code that generates the process trajectory for the end effector to process the surface of the object by facilitating an association of at least one of the predefined trajectories with the normalized image.

20. The program embodied in a computer-readable medium of claim 19, further comprising:

code that displays a non-normalized version of the image on the display device; and code that provides for a calibration of the non-normalized version of the image on the display device, thereby generating the normalized image.

21. The program embodied in a computer-readable medium of claim 20, wherein the code that provides for the calibration of the non-normalized version of the image on the display device further comprises:

code that facilitates a user identification of both a first point and a second point on the non-normalized version of the image on the display device; and code that inputs a distance between the first and second points.

22. The program embodied in a computer-readable medium of claim 19, wherein the number of predefined trajectories further comprises a predefined trajectory that is in the shape of a box.

23. The program embodied in a computer-readable medium of claim 19, wherein the number of predefined trajectories further comprise a predefined trajectory that is in the shape of a concave surface.

24. The program embodied in a computer-readable medium of claim 19, wherein the number of predefined trajectories further comprise a predefined trajectory that is in the shape of a cylinder.

25. The program embodied in a computer-readable medium of claim 19, wherein the number of predefined trajectories further comprise a reciprocation trajectory.

26. The program embodied in a computer-readable medium of claim 19, wherein the number of predefined trajectories further comprise a predefined trajectory that is in the shape of a cone.

27. The program embodied in a computer-readable medium of claim 19, wherein the number of predefined trajectories further comprise a predefined trajectory that is in the shape of a polygon.

28. The program embodied in a computer-readable medium of claim 19, wherein at least one of the number of predefined trajectories further comprises an orientation transition of the end effector.

29. The program embodied in a computer-readable medium of claim 19, wherein an orientation of the end effector is defined along each of the predefined trajectories.

30. The program embodied in a computer-readable medium of claim 29, further comprising code that provides for a user specification of the orientation of the end effector along each of the predefined trajectories.

31. The program embodied in a computer-readable medium of claim 19, wherein the code that generates the process trajectory for the end effector to process the surface of the object by facilitating the association of at least one of the predefined trajectories with the normalized image further comprises code that provides for a creation of a transition trajectory between consecutive ones of the predefined trajectories.

32. The program embodied in a computer-readable medium of claim 19, further comprising code that inputs a depth of the at least one predefined trajectories.

33. The program embodied in a computer-readable medium of claim 19, further comprising code that inputs a distance between a number of passes in the at least one predefined trajectories.

34. The program embodied in a computer-readable medium of claim 19, further comprising code that inputs a number of passes of the at least one predefined trajectories.

35. The program embodied in a computer-readable medium of claim 19, wherein the code that generates the process trajectory for the end effector to process the surface of the object by facilitating the association of at least one of the predefined trajectories with the normalized image further comprises code that facilitates a user fitting of the at least one of the predefined trajectories to a portion of the normalized image displayed on the display device.

36. The program embodied in a computer-readable medium of claim 35, wherein the code that facilitates the fitting of the at least one of the predefined trajectories to the portion of the normalized image displayed on the display device further comprises code that facilitates a user fitting the at least one of the predefined trajectories to the object displayed on the display device in two dimensions.

37. A system for generating a process trajectory, comprising:
a processor circuit having a processor and a memory;
a trajectory generation system stored in the memory and executable by the processor, the trajectory generation system comprising:
logic that generates a display of a normalized image of an object on a display device, the object including a surface that is to be processed using an end effector;
a number of predefined trajectories, each of the predefined trajectories defining a motion of the end effector to process a surface of one of a number of spatial definitions;
logic that generates the process trajectory for the end effector to process the surface of the object by facilitating an association of at least one of the predefined trajectories with the normalized image.

38. The system of claim 37, further comprising:
logic that displays a non-normalized version of the image on the display device; and
logic that provides for a calibration of the non-normalized version of the image on the display device, thereby generating the normalized image.

39. The system of claim 38, wherein the logic that provides for the calibration of the non-normalized version of the image on the display device further comprises:
logic that facilitates a user identification of both a first point and a second point on the non-normalized version of the image on the display device; and
logic that inputs a distance between the first and second points.

40. The system of claim 37, wherein the number of predefined trajectories further comprises a predefined trajectory that is in the shape of a box.

41. The system of claim 37, wherein the number of predefined trajectories further comprise a predefined trajectory that is in the shape of a concave surface.

42. The system of claim 37, wherein the number of predefined trajectories further comprise a predefined trajectory that is in the shape of a cylinder.

43. The system of claim 37, wherein the number of predefined trajectories further comprise a reciprocation trajectory.

44. The system of claim 37, wherein the number of predefined trajectories further comprise a predefined trajectory that is in the shape of a cone.

45. The system of claim 37, wherein the number of predefined trajectories further comprise a predefined trajectory that is in the shape of a polygon.

46. The system of claim 37, wherein at least one of the number of predefined trajectories further comprises an orientation transition of the end effector.

47. The system of claim 37, wherein an orientation of the end effector is defined along each of the predefined trajectories.

48. The system of claim 47, further comprising logic that provides for a user specification of the orientation of the end effector along each of the predefined trajectories.

49. The system of claim 37, wherein the logic that generates the process trajectory for the end effector to process the surface of the object by facilitating the association of at least one of the predefined trajectories with the normalized image further comprises logic that provides for a creation of a transition trajectory between consecutive ones of the predefined trajectories.

50. The system of claim 37, further comprising logic that inputs a depth of the at least one predefined trajectories.

51. The system of claim 37, further comprising logic that inputs a distance between a number of passes in the at least one predefined trajectories.

52. The system of claim 37, further comprising logic that inputs a number of passes of the at least one predefined trajectories.

53. The system of claim 37, wherein the logic that generates the process trajectory for the end effector to process the surface of the object by facilitating the association of at least one of the predefined trajectories with the normalized image further comprises logic that facilitates a user fitting of the at least one of the predefined trajectories to a portion of the normalized image displayed on the display device.

54. The system of claim 53, wherein the logic that facilitates the fitting of the at least one of the predefined trajectories to the portion of the normalized image displayed on the display device further comprises logic that facilitates a user fitting the at least one of the predefined trajectories to the object displayed on the display device in two dimensions.

55. A system for generating a process trajectory, comprising:

means for displaying a normalized image of an object on a display device of a computer system, the object including a surface that is to be processed using an end effector;

means for storing a number of predefined trajectories, each of the predefined trajectories defining a motion of the end effector to process a surface of one of a number of spatial definitions; and means for generating the process trajectory for the end effector to process the surface of the object by associating at least one of the predefined trajectories with the normalized image.

56. The system of claim 55, wherein at least one of the predefined trajectories is in the shape of a box.

57. The system of claim 55, wherein at least one of the predefined trajectories is in the shape of a concave surface.

58. The system of claim 55, wherein at least one of the predefined trajectories is in the shape of a cylinder.

59. The system of claim 55, wherein at least one of the predefined trajectories is a reciprocation trajectory.

60. The method of claim 55, wherein at least one of the predefined trajectories is in the shape of a cone.

61. The method of claim 55, wherein at least one of the predefined trajectories is in the shape of a polygon.

62. A method for generating a process trajectory, comprising:

displaying a normalized image of an object on a display device of a computer system, the object including a surface that is to be processed using an end effector; and providing a number of predefined trajectories in a memory of the computer system, each of the predefined trajectories defining a motion of the end effector to process a surface of one of a number of spatial definitions;

generating a process trajectory for the end effector to process the surface of the object by associating with the normalized image at least one of a number of predefined trajectories that define a motion of the end effector to process a surface of one of a number of spatial definitions.

* * * * *